United States Patent [19]

Vital et al.

[11] 4,049,996
[45] Sept. 20, 1977

[54] CONTROL OF ELECTRONICALLY GENERATED LIGHT PULSES

[75] Inventors: Zoltan Vital, Uccle; Jean Orban, Clabecq, both of Belgium

[73] Assignee: Ponder & Best, Inc., Los Angeles, Calif.

[21] Appl. No.: 580,519

[22] Filed: May 23, 1975

Related U.S. Application Data

[60] Division of Ser. No. 358,974, May 10, 1973, Pat. No. 3,943,406, which is a division of Ser. No. 17,634, March 9, 1970, Pat. No. 3,749,921, which is a continuation-in-part of Ser. No. 799,554, Feb. 13, 1969, abandoned.

[30] Foreign Application Priority Data

| Mar. 7, 1969 | Belgium | 71104 |
| June 27, 1969 | Belgium | 75962 |
| Sept. 22, 1969 | Belgium | 79321 |

[51] Int. Cl.$^2$ ............................................. H05B 41/32
[52] U.S. Cl. ........................... 315/151; 250/214 SF; 315/149; 315/159; 315/241 P; 354/33; 354/131
[58] Field of Search ............... 315/149, 151, 152, 153, 315/154, 159, 241 P; 354/33, 131, 132, 145; 250/214 SF

[56] References Cited

U.S. PATENT DOCUMENTS

| 3,288,044 | 11/1966 | Bramer | 250/214 SF |
| 3,591,829 | 7/1971 | Murata et al. | 315/159 X |
| 3,709,123 | 1/1973 | Tokutomi | 315/159 X |
| 3,944,877 | 3/1976 | Sato | 315/241 P |

*Primary Examiner*—Eugene La Roche
*Attorney, Agent, or Firm*—Spencer & Kaye

[57] ABSTRACT

Circuits and auxiliary elements for use with a device for controlling the emission of light pulses from a flash unit, which light pulses are produced by the discharge of current pulses from a capacitor, the device including a light sensing element for receiving light produced by the flash unit and reflected from an object in the light path. One such circuit includes a switch which is selectively operable to permit control of termination of the emission of light pulses at either one of two light intensity output levels. Another circuit permits one light sensing element to normally trigger the emission of a light pulse in response to a light pulse from a remote unit, and to be selectively connected to subsequently control termination of such emission. One such element is a special gas filled switching tube having two internal electrodes for triggering conduction through the tube in response to a low voltage. One further element is a special gas filled tube having no internal electrode and constructed to be triggered by receipt of a light emission.

2 Claims, 9 Drawing Figures

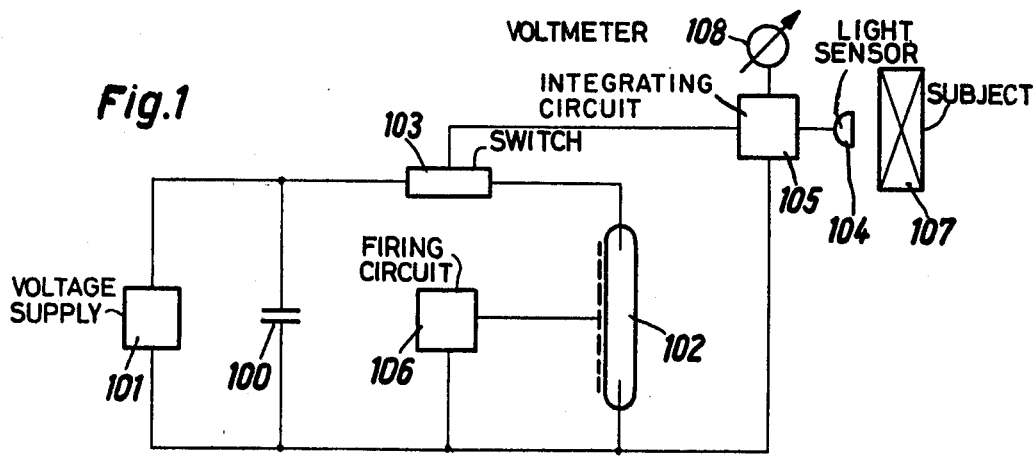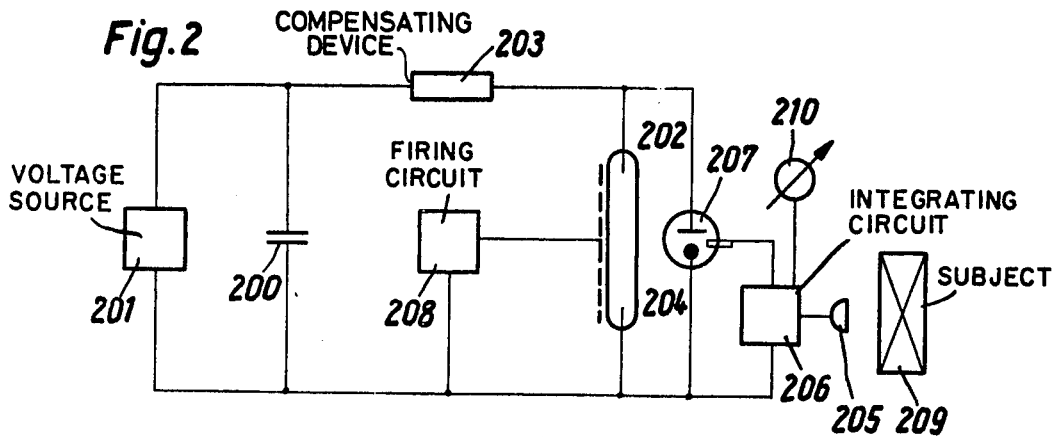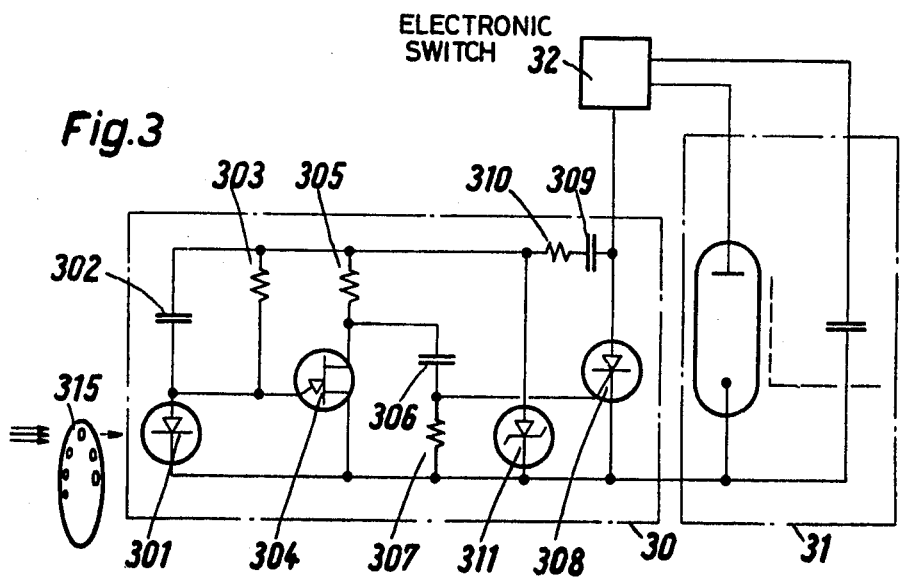

CONTROL OF ELECTRONICALLY GENERATED LIGHT PULSES

CROSS-REFERENCE OF RELATED APPLICATION

This application is a division of application Ser. No. 358,974, filed May 10th, 1973, now U.S. Pat. No. 3,943,406, itself a division of application Ser. No. 17,634, filed Mar. 9th, 1970 and now U.S. Pat. No. 3,749,921, the latter itself being a continuation-in-part of application Ser. No. 799,554, filed Feb. 13th, 1969, now abandoned.

BACKGROUND OF THE INVENTION

The invention concerns additional novel elements and circuits for use with the device disclosed in our U.S. Pat. No. 3,749,921, issued July 31st, 1973. That patent discloses various devices for controlling the impulses generated by the discharge of a capacitor placed either in series or in parallel with a load and, in the case of a parallel connection, having no more than one electronic switch. That patent also discloses novel switching tubes for uses as such switch.

One drawback of such devices is that when a high contrast scene, or subject, is to be photographed, the reflected light will not be measured with sufficient accuracy. Moreover, when a reflected light measuring and duration control device is used in a camera, and the subject to be photographed is moved and/or the illumination intensity is fluctuating, accurate measurement of the light reflected to the camera with known light measuring devices becomes difficult, and sometimes even practically impossible, and in any case requires a number of complex measurements, computations and evaluations.

SUMMARY OF THE INVENTION

An object of the present invention is to provide an improved measurement, computation and control of the light produced by a flash unit.

Another object of the present invention is a control device for pulses which are produced by the discharge from a capacitor, and which are delivered, for example, to the flash tube of an electronic flash unit. The control device serves to permit the flash unit to be controlled at different light intensity settings. This device is supplemented by a photoelectronic remote triggering device provided with a system which permits use even with indirect flashes from the flash unit. Means are provided to permit automatic switching between the devices.

Any of the light control devices described in our above-cited patent may be supplemented with a threshold value detector consisting of two zener diodes, a resistor for the compensation of the delays and variations in certain components, and a switch which permits operation of the light control device with a full light intensity output or a partial light intensity output of the flash unit.

A further object of the present invention is a device for controlling the pulses generated during the discharge of a capacitor and employing a gas-filled switching tube whose interior is provided with one or a plurality of triggering electrodes, which are designed to operate at relatively low voltages, preferably between 50 and 1000 volts, when compared to similar known devices or is provided with an electrically responsive light generating device which permits the use of a gas-filled tube having only the two main electrodes.

BRIEF DESCRIPTION OF THE DRAWINGS

FIG. 1 is a schematic circuit diagram of a basic circuit with which the improvements according to the present invention can be used.

FIG. 2 is a schematic circuit diagram of another form of construction of the circuit of FIG. 1.

FIG. 3 is a more detailed circuit diagram containing a more detailed showing of one embodiment of a flash duration control circuit.

DESCRIPTION OF THE PREFERRED EMBODIMENTS

Figure 4:
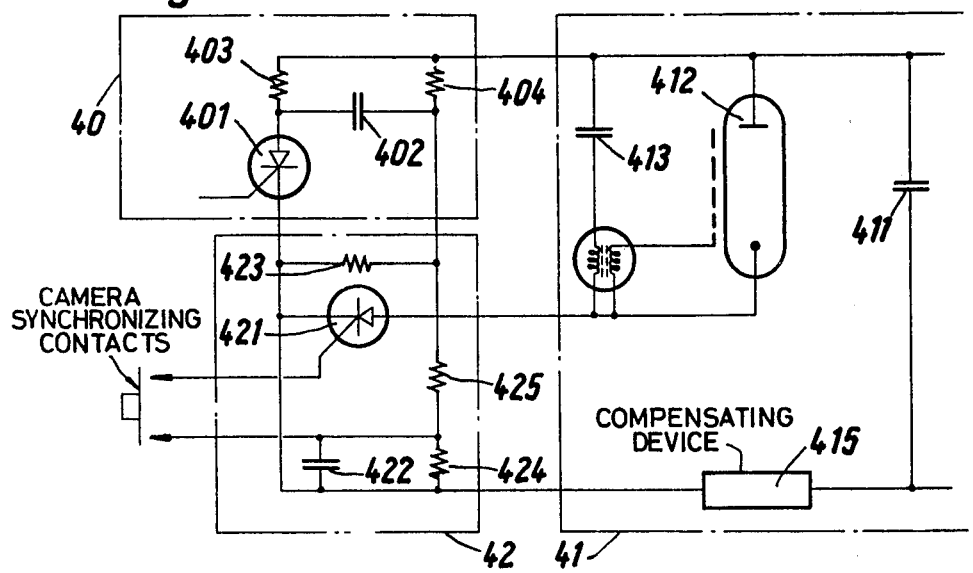
FIG. 4 is a view similar to that of FIG. 3 of another embodiment of a flash duration control circuit.

FIG. 1 shows the circuit of an electronic photoflash equipped with a control device having only one switch whose purpose is to arrest the capacitor discharge when a predetermined amount of light has been produced.

The arrangement of such a unit is as follows.

An energy storage capacitor 100 is charged through a voltage source 101. A flash tube 102 of the usual type is connected to the capacitor terminals through a switch 103 which is preferably a gate-turn-out thyristor or thyratron, etc., provided, if necessary, with suitable supplementary circuitry. A light sensor 104, composed of a photodiode, phototransistor, photoresistance, or other, is connected to an integrating circuit 105 of any well-known type. A firing circuit 106 triggers the firing of the flash tube 102. This device works as follows:

The capacitor 100 having been charged by the source 101, the ionization of the flash tube 102 is induced by the action of the firing circuit 106. The light sensor 104 supplying an instantaneous current proportional to the illumination on subject 107, to the integrating circuit 105, the latter, when the total amount of light received by the light sensor 104 reaches a predetermined value, causes a circuit to swing, thus supplying an impulse to the switch 103 which then interrupts the discharge of the capacitor 100.

Thus, the light emission of the flash tube is arrested after producing the requisite amount of light, without any energy being withdrawn from the capacitor other than that used for producing the light, and possibly for commutating the circuit.

The arrangement of FIG. 1 may be completed in the following manner: by connecting a voltmeter 108 to the terminals of the integrator circuit 105, which is designed for such a connection, an integrating photometer, or chronometer, can be produced, which device has scales in different measuring units.

Another variant is illustrated in FIG. 2 in which we describe a control device connected both in series and parallel with the load and combined with a compensating device, capable of also being used with the preceding embodiment, constituted by an induction coil.

The discharge capacitor 200 is charged through the voltage source 201. The flash tube 202 is connected to the terminals of the capacitor 200 through the intermediary of the induction coil 203. A thyratron 204 is connected in parallel with the flash tube 202. A light sensor 205 is coupled to the integrating circuit 206, receives reflected light from subject 209 and controls the firing electrode 207 of the thyratron 204. A firing circuit 208 acts to fire the flash tube 202. Meter 210 is connected to circuit 206.

The operation of the circuit of FIG. 2 differs from that of FIG. 1 as follows.

After reaching the predetermined signal value, the circuit of the integrator 206 triggers the firing electrode 207 of the thyratron 204 in parallel with the flash tube 202. The induction coil 203 allows for a short period during which the thyratron is practically in short-circuit. Consequently the flash tube 202 has enough time to deionize, and hence to become extinguished.

A modification is illustrated in FIG. 3. This control device is combined with both an electronic gate and an optical device of regulation of the sensitivity.

Figure 5:
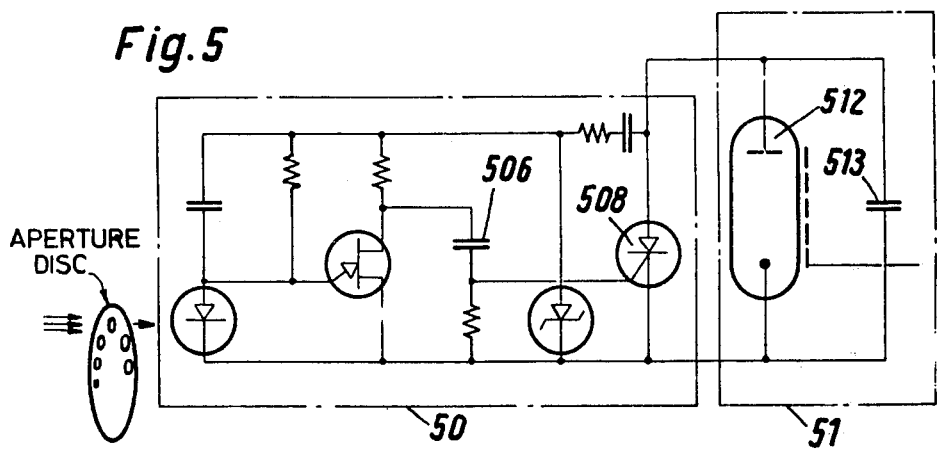
FIG. 5 is a view similar to that of FIG. 3 of still another embodiment of a flash duration control circuit.

The control device consists of an electronic device 30 which is identical with the device 50 of FIG. 5, of the photoflash unit 31 and of an electronic switch 32.

In this device, a light sensor 301 generates a current proportional to the relfected light from the subject. This current is integrated by a capacitor 302 to give a voltage proportional to the amount of the reflected light. This voltage is applied to a unijunction transistor 304 or to a four-layer diode or to some other element or device which would serve as suitable substitute, which develops a positive impulse in the resistance 305 as soon as the threshold swing or switching level, of this component 304 has been reached.

This impulse is conducted by the capacitor 306 to open a semiconductor switch, or other element, 308 by means of its firing circuit which controls the electronic switch 32 so as to terminate the capacitor discharge and thereby extinguish the flash tube of the photoflash 31.

As soon as the cycle is ended, the voltage across a resistance 303 sets the system back to its initial condition. A resistance 307 prevents a premature opening of the semiconductor switch 308. The unit 31 contains the elements of the photoflash which are not individually referenced. The electronic device 30 contains as its principal element a semiconductor switch, such as a thyristor (SCR), or else a gas-filled switching tube, preferably of the arc arrester type or a special arc arrester, or another suitable component.

An improvement of the flash control device consists in equipping this device with an electronic gate which acts upon the reflected light sensor circuit.

FIG. 3 also illustrates the electronic gate arrangement. When the flash tube is fired, the voltage at the flash tube terminals decreases sharply. This results in a current in the circuit of the capacitor 309, the resistance 310 and the zener diode 311. A voltage equal to that across the zener diode is to appear at the terminals of the light sensor circuit so as to place it in operation. The current intensity depends on the resistance value of resistor 310. The opening duration of the electronic gate of the light sensor circuit depends on the value of the capacitor 309.

The regulation of the sensitivity of the control device is effected by the user with the help of an adjustable optical device 315 composed of a diaphragm, a set of filters, or others, placed in front of the light sensor 301 of the control device.

A further explanation is given with reference to FIG. 4 which shows a light control device for the flash of an electronic photoflash, consisting of the electronic device 40, which is similar to the device 30 of FIG. 3 and the device 50 of FIG. 5 and which is therefore only partially shown, of the photoflash 41, which is similar to the device 31, and of an electronic switch 42, which is similar to the device 32, connected in series with the flash tube circuit.

This device and its operation are essentially identical to those described and illustrated previously, namely:

The thyristor 421, which is fired upon closing of the camera synchronization contacts, applies the voltage of the discharge capacitor 411 across the flash tube 412, the latter having received previously a fraction of this voltage, the value of which fraction is determined by the resistances 404 and 423, and to the tube firing circuit consisting of a capacitor 413 and a transformer 414, thus firing the flash. When the thyristor 401 becomes conductive due to the subject having been sufficiently illuminated, it discharges the capacitor 402, which was previously charged, into the thyristor 421, which results in reversing the anode voltage of the thyristor for a short period so as to cause it to block and thus arrest the discharge of the capacitor 411. The capacitance value of the capacitor 402 is selected so as to obtain an impulse of sufficient duration to allow the extinction, or blocking, of the thyristor 421. The capacitance value of the capacitor 422 is selected so as to obtain the shortest possible impulse so that the extinction of the thyristor 421 may occur as rapidly as possible. The resistance 424 and 425 are used to polarize the capacitor 422. The value of resistance 403 must be selected in order to give a current lower than the maintenance current of the thyristor 401 so as to prevent the capacitor 411 from continuing to discharge itself through the thyristor 401. A compensation device, such as an induction coil, 415 modifies the discharge impulse in the flash tube. Among other things, it lengthens the discharge duration, etc.

FIG. 5 shows a control device combined with an electronic gate and with an optical device for the regulation of sensitivity. This control device consists of an electronic device 50 and the photoflash 51.

The components and operation of this device are identical to those described with reference to FIG. 3, with the difference that an impulse transmitted by the capacitor 506 opens a semiconductor switch, or a special arc arrester, etc., 508, via its firing circuit and thereby extinguishes the flash tube 512 of the photoflash while discharging the capacitor 513 of the latter.

Figure 6:
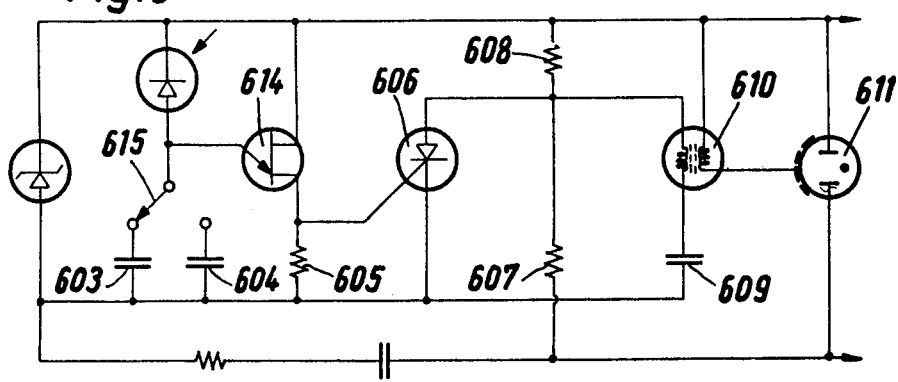
FIG. 6 is a view similar to that of FIG. 3 of yet another form of construction of a flash duration control circuit.

In FIG. 6, we describe another embodiment equipped with a special arc arrester combined with an electronic gate and with an electric device having several capacitors for the regulation of sensitivity. A special arc arrester 611 and its firing device, which consists of the thyristor 606, the resistances 607 and 608, the capacitor 609 and the transformer 610, serve as a substitute for the thyristor 508 of FIG. 5. Here, we make use of an electric circuit for adjusting the sensitivity, the circuit consisting of a switch 615 connected to select one of the capacitors 603 and 604 having different capacitance values.

Figure 7:
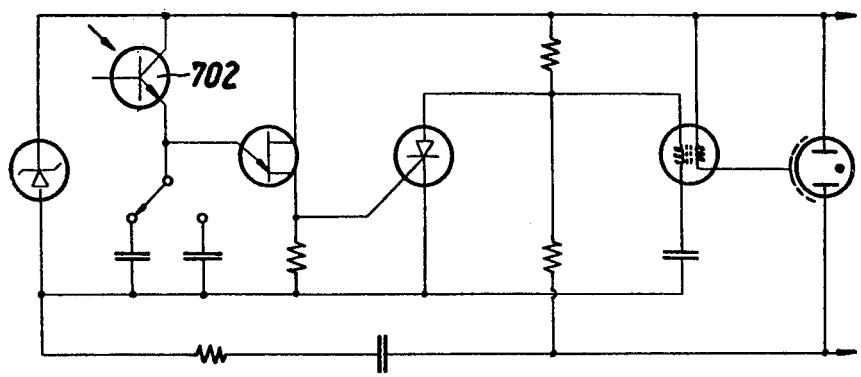
FIG. 7 is a view similar to that of FIG. 3 of a further form of construction of a flash duration control circuit.

In FIG. 7 there is shown another embodiment in which the photodiode is replaced by a phototransistor 702 in order to give a higher sensitivity to the light integrator than is possible with the photodiode.

Figure 8:
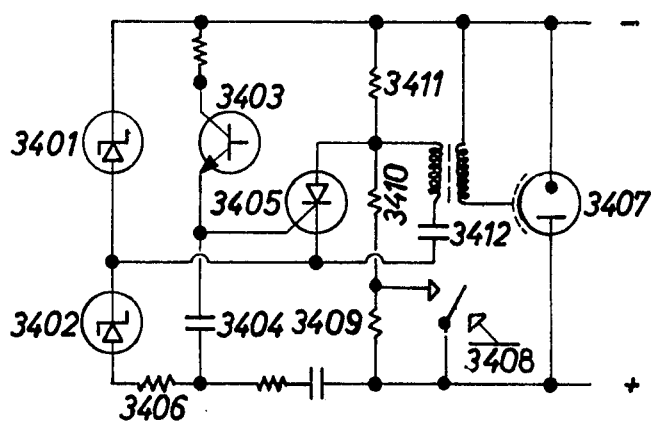
FIG. 8 is a circuit diagram of a modified light duration control circuit according to the invention.

FIG. 8 illustrates one embodiment of a circuit possessing other novel features according to the invention. In this case two zener diodes 3401 and 3402 are employed in a series connection so that the total voltage across them determines the supply voltage of the light-sensing phototransistor 3403. The voltage across the zener diode 3402 alone determines the value which the voltage across the integration capacitor 3404 must reach in order to fire the thyristor 3405.

The circuit includes a resistor 3406 across which is produced a voltage proportional to the nonlinearity error of the control device, which error is caused by voltage fluctuations of the zener diodes 3401 and 3402, by the switching delays of the thyristor 3405 and by the arc arrester 3407. The resistor 3406 is connected in such a way as to compensate this error.

When thyristor 3405 fires, i.e., becomes conductive, it causes capacitor 3412 to discharge through the primary winding of a transformer 3413 whose secondary winding is connected to arrester 3407. The voltage to which capacitor 3412 is charged prior to the firing of thyristor 3405 is determined in part by the value of resistors 3409, 3410 and 3411.

A switch 3408 is connected across resistor 3409 and when this switch is opened resistors 3409, 3410 and 3411 determine the voltage of the firing capacitor 3412, corresponding to the full power output of the flash.

When switch 3408 is closed, only the resistors 3410 and 3411 determine the voltage of the tiring capacitor corresponding to a partial power output from the flash.

According to another feature of the invention, the light control device of an electronic flash unit can be supplemented to give it the capability of initially functioning as a light responsive flash trigger device, or slave unit, and then automatically switching to function as a light duration control unit. This combined device is so constructed that it performs the automatic switching between the two modes of operation. This device preferably employs a single light-sensitive element to initiate the two functions, and possible further common components. This means that during its periods of use as a remote triggering device, the light-sensitive element is not conducting an electric current and thus operates as a simple photovoltaic element or the like, whereas during the period when it operates as a flash control device, the light-sensitive element is connected to an electric current supply and thus operates as a photodiode or the like.

Figure 9:
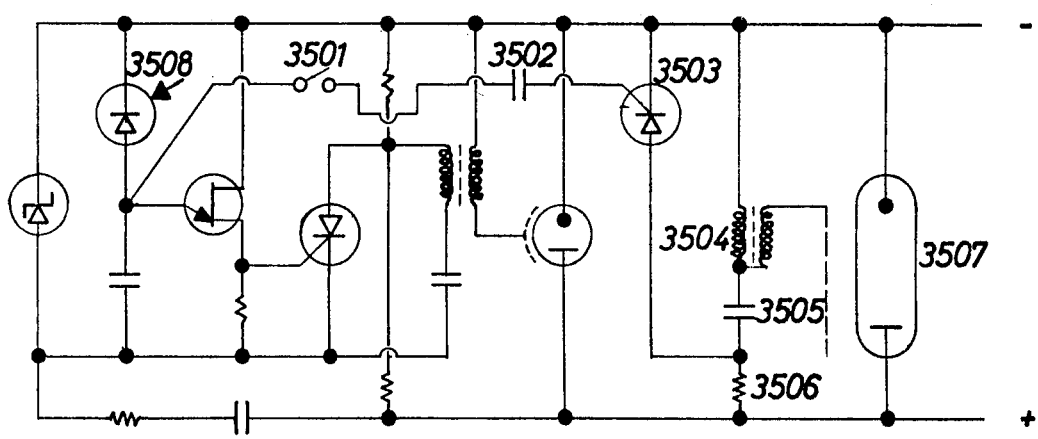
FIG. 9 is a circuit diagram of a control circuit according to the invention for controlling both the initiation and termination of a light flash.

FIG. 9 illustrates one exemplary embodiment of such a device in which the circuit substantially illustrated in FIG. 6 is supplemented with the following components: a switch 3501 for connecting or disconnecting the remote triggering device and a capacitor 3502 connected in series between the light-sensitive element 3508 and the gate electrode of a thyristor 3503, as well as other components present in a conventional electronic flash assembly, such as the firing transformer 3504, the firing capacitor 3505, the resistor 3506 and the flash tube 3507, thyristor 3503 being connected across the series arrangement of capacitor 3505 and transformer 3504.

The device operates as follows:

when switch 3501 of the light duration control device of the flash unit is closed, the photoelectric remote triggering device is also rendered operative. The light-sensitive element operates in this case principally as a photoelement without any steady-state electric current.

In this mode of operation, when the light from an external main flash instrument reaches the photoelement 3508 of the slave flash unit, it produces a voltage pulse which triggers the thyristor 3503 via the switch 3501 and capacitor 3502, and thus the flash tube 3507 of the flash unit.

Thereafter, the light duration control device operates in the same manner as it was described in connection with FIG. 6, i.e. the electric current supply for the light receiver 3508 which now operates as a photodiode, is supplied with an operating voltage and can no longer operate as a remote triggering device as long as that current supply is not interrupted, which does not occur until the end of the flash being produced by its flash unit.

On the other hand, when the switch 3501 is open, only the light duration control function will be performed.

Figure 10:
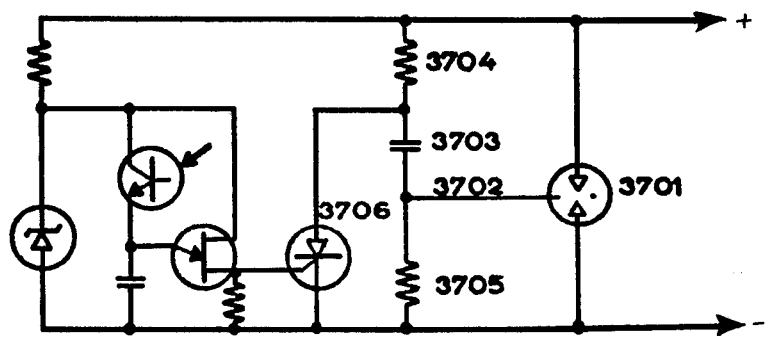
FIG. 10 is a circuit diagram of a control circuit according to the invention employing a low voltage activated gas-filled tube.

FIG. 10 shows a control circuit similar to those previously described and employing a gas-filled switching tube 3701 which is provided with an internal low voltage control or triggering electrode 3702.

The capacitor 3703 is connected to be charged by resistors 3704 and 3705 to the voltage which is applied to the terminals of the gas-filled switching tube 3701. When thyristor 3706 is fired, the voltage to which capacitor 3704 has been charged is applied to the internal low voltage control electrode 3702 of the gas-filled switching tube 3701, so that it is also fired. The thyristor 3706 is connected in a circuit identical with that shown in FIG. 7.

Figure 11:
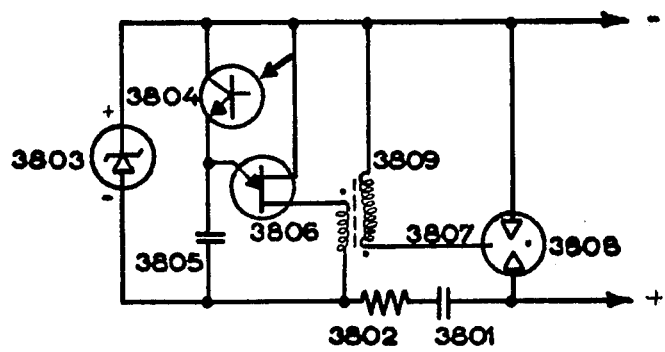
FIG. 11 is a view similar to that of FIG. 10 of another embodiment of such circuit.

FIG. 11 shows a circuit employing gas-filled switching tube 3808 provided with an internal low voltage control electrode 3807 which is controlled by a low voltage pulse transformer 3809 which is in turn directly controlled by a unijunction transistor 3606. Capacitor 3801, resistor 3802 and zener diode 3803 form an electronic current gate which functions in the same manner as elements 308, 310 and 311 of FIG. 3.

The phototransistor 3804, the capacitor 3805 and the unijunction transistor 3806 form the integrator and threshold value detector, which operate in the same manner as the corresponding elements shown in FIG. 7. The pulse generated by unijunction transistor 3806 is transmitted by the pulse transformer 3809 to the internal low voltage control electrode 3807 of the gas-filled switching tube 3808.

Figure 12:
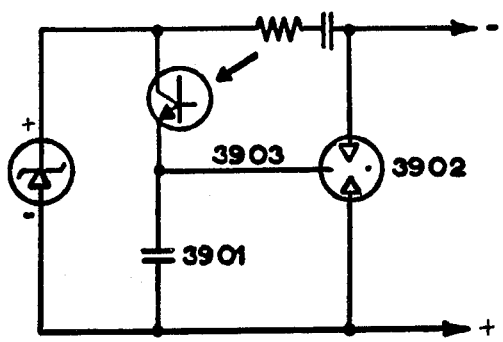
FIG. 12 is a view similar to that of FIG. 10 of a further embodiment of such circuit.

FIG. 12 shows a highly simplified control circuit including a gas-filled switching tube 3902 provided with an internal low voltage control electrode 3903 directly controlled by the integration capacitor 3901. The terminal voltage of the integration capacitor 3901 controls the firing of the gas-filled switching tube 3902 when a sufficient quantity of light has reached phototransistor 3904, directly through the internal low voltage control electrode 3903.

Figure 13:
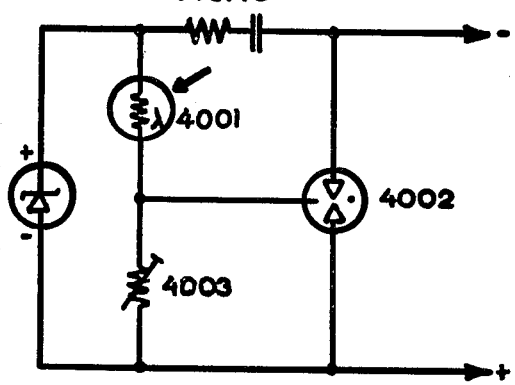
FIG. 13 is a view similar to that of FIG. 10 of a further embodiment of such circuit.

The circuit of FIG. 13 is substantially the same as that of FIG. 12 except that the internal low voltage control electrode of the gas-filled switching tube 4002 is controlled directly by a photoresistor 4001 which simultaneously serves as the light integrator. The control voltage of the internal electrode of the gas-filled switching tube 4002 is obtained at the terminals of a variable resistor 4003.

Figure 14:
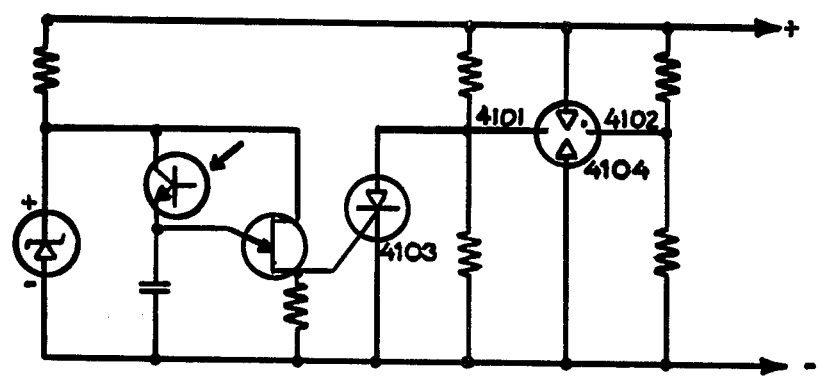
FIG. 14 is a view similar to that of FIG. 10 of a still further embodiment of such circuit.

FIG. 14 shows a circuit employing a gas-filled switching tube 4104 provided with two internal low voltage control electrodes 4101 and 4102 one of which is polarized by a voltage divider at a fixed voltage whereas the other is controlled in the same manner as the control electrode of the circuit of FIG. 10. In the quiescent state, the voltages at the two internal control electrodes 4101 and 4102 are identical.

When the thyristor 4103 fires, there results an inequality between these two voltages. This inequality has the effect of firing the gas-filled switching tube 4104. Otherwise this circuit is the same as that of FIG. 10.

Figure 15:
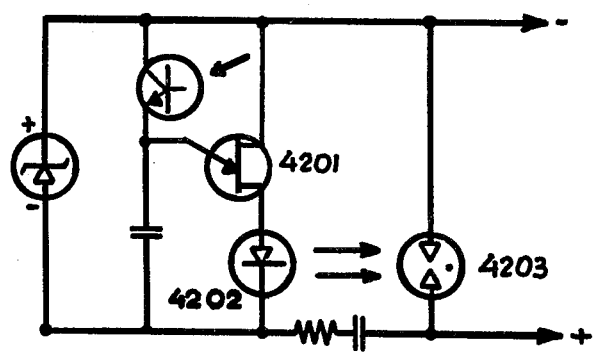
FIG. 15 is a view similar to that of FIG. 10 of yet another embodiment of such circuit.

The circuit of FIG. 15 employs a gas-filled tube 4203 without any internal or external control electrode. The firing of the tube is controlled by an electrically responsive light generating element, e.g. by a gallium arsenide diode. This apparatus operates in principle in the same manner as the circuit shown in FIG. 11, except that the pulse of the unijunction transistor 4201 controls a light emitting diode 4202 whose light pulse is directed toward the gas-filled switching tube 4203 and initiates its firing.

Figure 16:
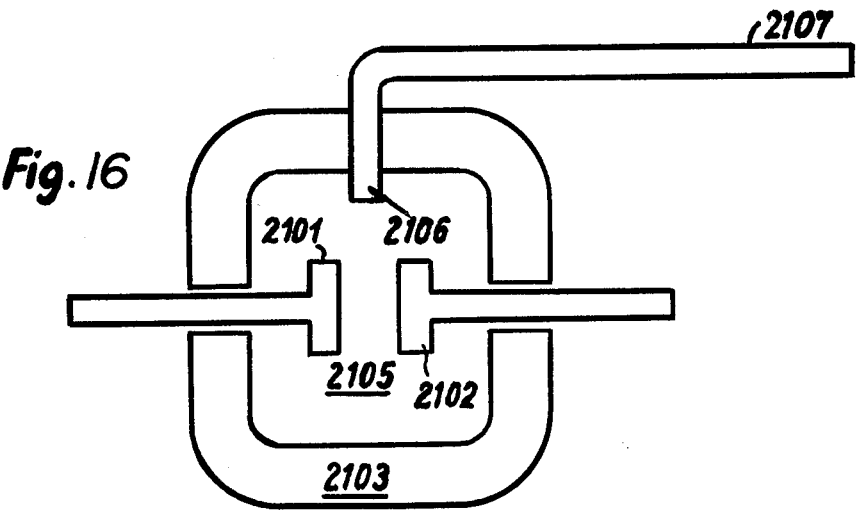
FIG. 16 is an elevational view of one embodiment of the gas-filled tube employed in the embodiments of FIGS. 10-13.

In FIG. 16 there is shown one embodiment of the above-mentioned special gas-filled tube of the arc arrester type. This consists of an electrically isolating enclosure 2103, which can be transparent, translucent or opaque, whose interior 2105 is filled with a gas, preferably argon, and contains two preferably identical and unpolarized electrodes 2101 and 2102. A third firing electrode 2106 protrudes into the interior 2105 of the enclosure 2103 and is extended by the connecting wire 2107. The electrodes 2101 and 2102 are located and formed in such a way, and the filling and the pressure of the gas are chosen in such a manner, that this tube will function to perform an arc operation.

Figure 16A:
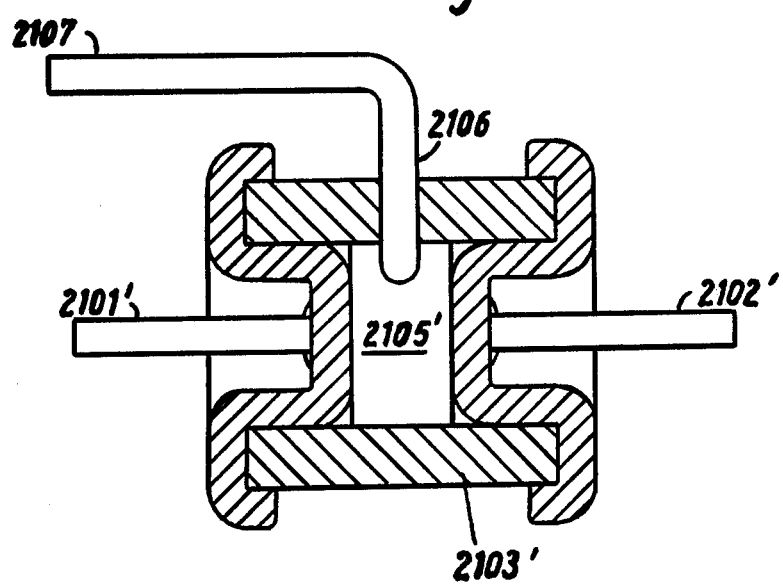
FIG. 16a is a cross-sectional view of a modified form of construction of the embodiment of FIG. 16.

As can be seen from FIG. 16a, which shows a modified embodiment of the device of FIG. 16, the enclosure 2103' is formed in the shape of a tube and is delimited by two electrodes 2101' and 2102' of the socket type, and of large surface area. The length of this tube is about the same as its diameter.

It will be understood that the above description of the present invention is susceptible to various modifications, changes and adaptations and the same are intended to be comprehended within the meaning and range or equivalents of the appended claims.

We claim:

1. A device for controlling the initiation and duration of light flashes produced by a light flash tube in response to pulses produced by the discharge of a capacitor and including a light sensitive element arranged for receiving light coming from a given direction and operatively connected to said tube for triggering the production of a light flash by said tube in response to the application of light to said element wherein the improvement comprises a control circuit connected to said light sensitive element and operatively associated with said tube for controlling the duration of the flash produced by said tube in dependence on the quantity of light received by said light sensitive element after the commencement of such flash.

2. An arrangement as defined in claim 1 further comprising a switch connected between said light sensitive element and said tube and switchable into a state for operatively disconnecting said element from said tube for disabling the automatic light triggering operation of said device.

* * * * *